United States Patent
Woo

[19]

[11] Patent Number: 6,158,711
[45] Date of Patent: Dec. 12, 2000

[54] FLOW CONTROL VALVE WHICH RESTRAINS HEAT EXCHANGE BETWEEN HIGH TEMPERATURE HEAT EXPANSION SOLUTION AND LOW TEMPERATURE COOLANT

[75] Inventor: Gi-Myoung Woo, Kyonggi-do, Rep. of Korea

[73] Assignee: Samsung Electronics Co., Ltd., Kyungki-Do, Rep. of Korea

[21] Appl. No.: 09/274,966

[22] Filed: Mar. 23, 1999

[30] Foreign Application Priority Data

Mar. 23, 1998 [KR] Rep. of Korea .................. 98-9920

[51] Int. Cl.$^7$ ................................................ F16K 31/126
[52] U.S. Cl. ................................................ 251/11; 60/513
[58] Field of Search .................. 251/11, 331, 61, 251/61.1, 61.2; 60/508, 512, 513, 515; 92/90, 96

[56] References Cited

U.S. PATENT DOCUMENTS

| | | | |
|---|---|---|---|
| 3,912,219 | 10/1975 | Weinstein | 251/11 |
| 3,918,677 | 11/1975 | Cowan | 251/61.1 |
| 4,364,238 | 12/1982 | Huelle et al. | 62/217 |
| 5,186,001 | 2/1993 | Muntz et al. | 60/518 |
| 5,984,257 | 11/1999 | Baek et al. | 251/11 |

*Primary Examiner*—Kevin Shaver
*Assistant Examiner*—Eric Keasel
*Attorney, Agent, or Firm*—Sughrue, Mion, Zinn, Macpeak & Seas, PLLC

[57] ABSTRACT

A flow control valve includes a base plate, a cover plate coupled on the base plate, having an inlet and an outlet, an adiabatic chamber formed within the cover plate and supported on the upper surface of the base plate, and a pressure generating space at the lower portion of the adiabatic chamber. The pressure generating space is filled with heat expansion solution. A hollow is formed at a mid-portion of the adiabatic chamber to communicate with the pressure generating space. A membrane is coupled to the upper circumference of the adiabatic chamber, a coolant space where coolant is filled is located between the cover plate and the adiabatic chamber, a disc is coupled to the lower surface of the adiabatic chamber for sealing the pressure generating space, and a heating member is provided for heating the heat expansion solution filled in the pressure generating space.

8 Claims, 5 Drawing Sheets

FLOW CONTROL VALVE WHICH RESTRAINS HEAT EXCHANGE BETWEEN HIGH TEMPERATURE HEAT EXPANSION SOLUTION AND LOW TEMPERATURE COOLANT

BACKGROUND OF THE INVENTION

1. Field of the Invention

The present invention relates to a flow control valve for controlling flow of a coolant that is applied to the refrigeration cycle and, more specifically, to a flow control valve capable of securing reliability in operation of the valve by restraining heat exchange from a heat expansion solution in a high temperature state to a coolant in a low temperature state, thereby enhancing the expansion efficiency of a heat expansion solution.

2. Description of the Related Art

Generally, a refrigeration unit includes an evaporator, a compressor, a condenser, and an expansion valve. Such refrigeration unit lowers circumference temperature by respectively performing the refrigeration cycle consisting of evaporation, compression, condensing, and expansion strokes at the evaporator, compressor, condenser, and expansion valve.

The refrigeration cycle is described as follows.

At the evaporator, liquefied coolant supplied by the expansion valve is vaporized by taking away latent heat from surrounding air. As a result, the temperature of the surrounding air is lowered. The cooled air maintains a cooling room at a low temperature by natural convection or a blowing fan. The liquefied coolant supplied from the expansion valve and the vaporized coolant exist together in the evaporator. Here, while the coolant changes from liquid to vapor state, vapor pressure has a specific relation to vapor temperature.

Coolant in gas state that is vaporized in the evaporator is absorbed into the compressor, which maintains the inside of the evaporator at low pressure even though its temperature is very low to actively vaporize coolant remaining in the liquid state.

Meanwhile, the vaporized coolant absorbed into the compressor is compressed in the cylinder by a piston, thereby increasing its pressure so that the vaporized coolant can be easily liquefied even though it is cooled by water at room temperature or cooling air.

Thereafter, the compressed gas of the compressor is cooled and liquefied in the condensing stroke. Like the evaporation stroke, the coolant in the condensing stroke exists in both liquid and vapor states. During phase transformation from vapor state to liquid state, the condensing pressure has a specific relation to the condensing temperature.

The expansion stroke then lowers the pressure of the liquefied coolant to a state capable of easy vaporization prior to sending the liquefied coolant into the evaporator. The expansion stroke is performed by the expansion valve. Such expansion valve controls the flow of the coolant to the evaporator as well as lowering its pressure. The flow of the coolant vaporized in the evaporator determines the heat flow to be removed from the refrigeration room under a given evaporation temperature(evaporation pressure). Therefore, it is important to precisely control a supply flow of the coolant.

In summary, the expansion valve adiabatically expands liquid coolant of high temperature and high pressure into liquid coolant of low temperature and low pressure by throttling and simultaneously functions as a flow control valve for maintaining an appropriate supply flow of the coolant in accordance with the given load of the evaporator.

There are various kinds of expansion valves known of which have different modes of operation and structure. Recently, a flow control valve has been provided using both heat and air pressure, which has such characteristics that driving force is high, fine driving is possible, and fabrication cost is low.

FIG. 1 is a sectional view showing a conventional flow control valve.

Referring to FIG. 1, the conventional flow control valve includes a predetermined shaped cap 1, a bottom plate 3 of heater, in which the bottom plate 3 is made of ceramic material and has inlets 2 at both sides thereof. The conventional flow control valve also includes an aluminum(Al) electrode 5 having a heating electrode 4 placed at the central portion thereof. The Al electrode 5 is mounted on and fixed to the upper face of the bottom plate 3. A membrane 7 is mounted on and fixed to circumference of the Al electrode 5 with a spacer 6 interposed therebetween. A lower attaching layer 8 is disposed between the upper face of the Al electrode 5 and the bottom face of the spacer 6, and an upper attaching layer 9 is disposed between the bottom face of the membrane 7 and the upper face of the spacer 6, for enhancing the attaching force. A heat expansion solution 10 is filled in a space 14 formed between the Al electrode 5 and the membrane 7. A sealing bottom plate 11 is fixed to the bottom plate 3 of the heater, for sealing the inlets 2 for the heat expansion solution. The electric power lines 12 run to the Al electrode 5.

The cap 1 has a space 1a through which the coolant passes. An inlet 1b for introducing the coolant into the space 1a and an outlet 1c for exhausting the coolant from the space 1a to the outside are formed to communicate with the space 1a in the cap 1.

In order to assemble the above conventional flow control valve, an aluminum(Al) electrode 5 having a heating electrode 4 of Ta-Al alloy is fixed on the upper surface of the bottom plate 3 of the heater, and the lower attaching layer 8, the spacer 6, the upper attaching layer 9 and the membrane 7 are assembled on the Al electrode 5 in the named order such that the space 14 is formed.

Afterwards, the heat expansion solution 10 is supplied through the inlets 2 from the lower portion of the bottom plate 3 of the heater and a sealing plate 11 is attached to the lower surface of the bottom plate 3 of the heater for the sealing of the heat expansion solution inlets 2. Thereafter, the sealing plate 11 is mounted on the bottom surface of the cap 1 and is then fixed thereto. Next, the electric power lines 12 are drawn from outside of the cap 1. Finally, the central portion of the membrane 7 is placed at the direct lower portion of the outlet 1c that is formed in the cap 1.

In the above described conventional flow control valve, the liquid coolant is introduced through the inlet 1b of the cap 1, passes through the space 1a formed therein, and is then exhausted to evaporator through the outlet 1c.

When flow control of the liquid coolant is needed, a voltage is applied to the Al electrode 5 through the electric power line 12 placed at the outside of the cap 1 and accordingly the heating electrode 4 of Ta-Al emits heat. As a result, the heat expansion solution 10 is expanded, which is filled in the space bounded by the Al-electrode 5, the spacer 6, and the membrane 7. As shown in FIG. 2, by heat expansion of the heat expansion liquid 10, the central portion of the membrane 7 is swollen towards the outlet 1c of the cap 1 to control exhaust flow of the coolant through the outlet 1c, whereby total flow of the coolant is controlled.

The conventional flow control valve however has a shortcoming that heat exchange is very active since the coolant and heat expansion liquid 10 are separated only by the membrane 7.

In other words, when the electric power is applied to the Al electrode 5, the heating electrode 4 of Ta-Al alloy becomes heated and thereby heat is emitted therefrom. The emitted heat enhances temperature of the heat expansion solution 10 to a considerable degree. Since heat of the temperature-enhanced heat expansion solution 10 is transferred into the coolant of low temperature, the heat expansion solution 10 does not maintain a high temperature. Therefore, the heat expansion efficiency is lowered and flow control activity is accordingly lowered, negatively affecting the reliability of the product.

SUMMARY OF THE INVENTION

It is therefore an object of the present invention to provide a flow control valve capable of effectively restraining heat exchange between heat expansion solution of high temperature and coolant of low temperature.

It is another object of the present invention to provide a flow control valve capable of securing reliability in operation by preventing temperature of heat expansion solution in a high temperature state from being lowered by coolant in a low temperature state, thereby effectively expanding the heat expansion solution.

To achieve the above objects and other advantages, a flow control valve comprises: a base plate; a cover plate coupled on the base plate, having an inlet and an outlet; an adiabatic chamber formed within the cover plate and supported on the upper surface of the base plate, which has a pressure generating space formed at the lower portion of the chamber that is filled with heat expansion solution and a hollow formed at the mid portion of the chamber to communicate with the pressure generating space; a membrane coupled to the upper circumference of the adiabatic chamber; a coolant space in which coolant is filled positioned between the cover plate and the adiabatic chamber; a disc coupled to the lower surface of the adiabatic chamber for sealing the pressure generating space; and means for heating the heat expansion solution filled in the pressure generating space.

So as to prevent the heat expansion liquid from leaking, a sealing member is selectively interposed between the adiabatic chamber and the disc.

It is preferable that the adiabatic chamber include an upper space formed at the upper surface thereof. The bottom of the upper space is an inclined plane that is downwardly inclined toward the hollow. The heat expansion solution is filled between the inclined plane of the upper space and the membrane.

Also, the cover plate comprises a receiving groove formed at the lower face thereof at a selected depth, in which a sealing member such as an O-shaped ring is inserted to prevent leakage of the coolant.

According to another aspect of the invention, the heating means comprises: a pair of thin film electrodes formed apart from each other on the upper surface of the disc; a pair of terminal lugs respectively electrically connected to the pair of thin film electrodes through holes formed in the disc, one end of each of the pair of terminal lugs extending below the disc; and a thin heating film formed on the disc, for electrically connecting the pair of thin film electrodes to each other.

According to still another aspect of the invention, the heating means comprises a PTC element established at the lower face of the disc, for heating the disc.

According to yet still another aspect of the invention, the heating means comprises: a pair of terminal lugs respectively inserted through a pair of through holes, one end of each of the pair of terminal lugs extending below the disc and the other end of each of said pair of terminal lugs extending above the disc; and a heating coil for connecting the ends of the terminal lugs above the disc to each other.

BRIEF DESCRIPTION OF THE DRAWINGS

The above object and other advantages of the present invention will become more apparent by describing in detail the preferred embodiments thereof with reference to the accompanying drawings, in which:

FIG. 4b is a sectional view of the heating member of FIG. 4a;

DETAILED DESCRIPTION OF THE PREFERRED EMBODIMENTS

The present invention is described hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having skill in the art.

Figure 1:
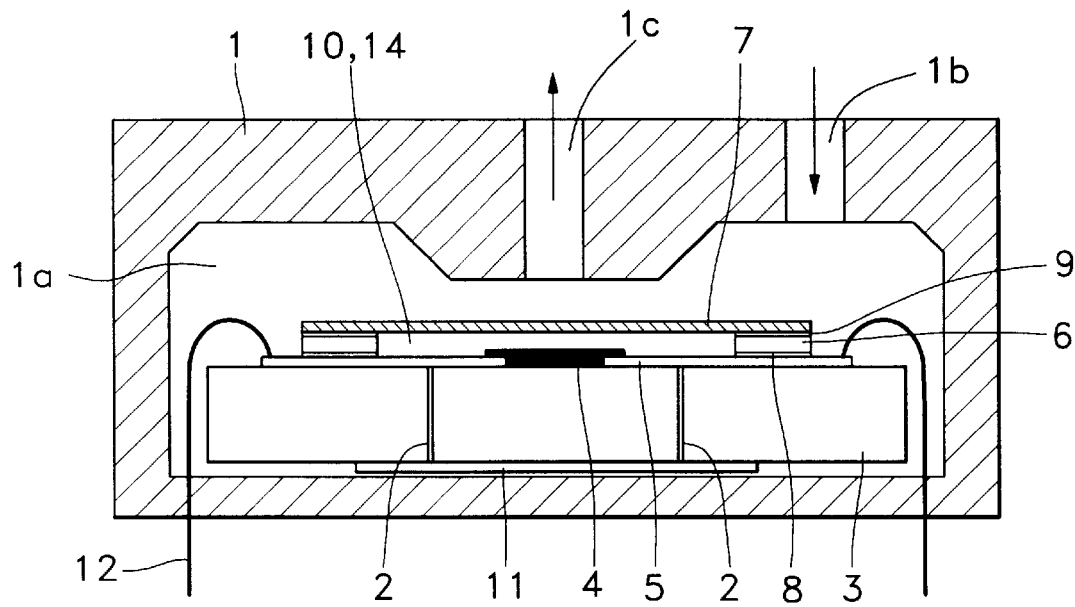
FIG. 1 is a sectional view showing a conventional flow control valve when the heat expansion liquid is not expanded.
Figure 2:
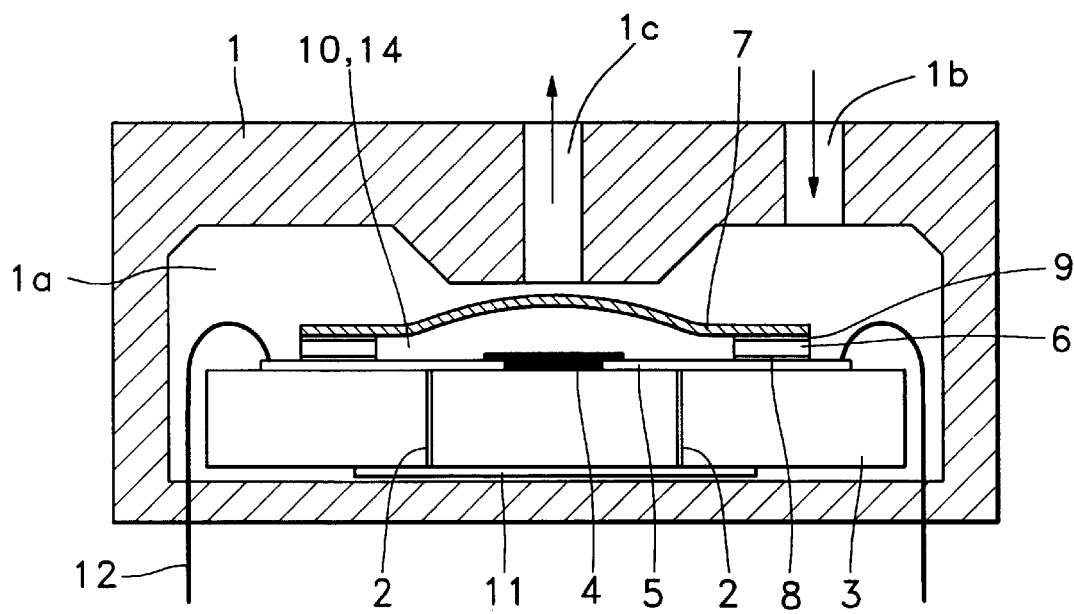
FIG. 2 is a sectional view showing a conventional flow control valve when the heat expansion liquid is expanded.
Figure 3:
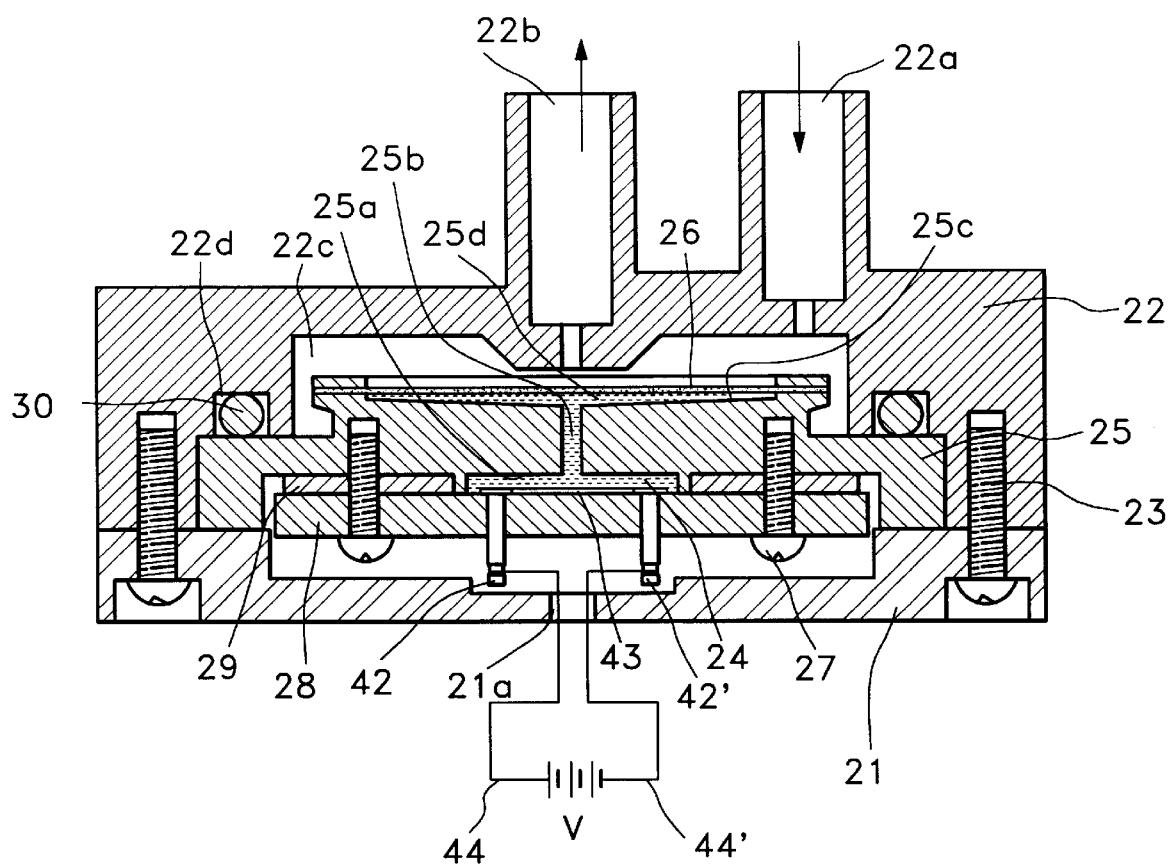
FIG. 3 is a sectional view of a flow control valve according to one embodiment of the present invention.

FIG. 3 shows a flow control valve according to one preferred embodiment of the present invention.

Referring to FIG. 3, a flow control valve includes a base plate 21, a cover plate 22 mounted on the base plate 21 and coupled thereto by a few bolts 23. The cover plate 22 has an inlet 22a and an outlet 22b placed apart from each other. An adiabatic chamber 25 is disposed within the cover plate 22, and is supported on the upper surface of the base plate 21. The adiabatic chamber 25 has a pressure generating space 25a that is formed at a lower portion thereof, the pressure generating space being filled with heat expansion solution 24. A hollow 25b is disposed at the mid portion of the adiabatic chamber 25 and communicates with the pressure generating space 25a. A membrane 26 is coupled to the upper circumference of the adiabatic chamber 25 and forms a coolant space 22c where coolant is filled, together with the cover plate 22 and the adiabatic chamber 25. A disc 28, coupled to the bottom surface of the adiabatic chamber 25 by a few bolts 27, seals the pressure generating space 25a. A packing 29 is interposed between the disc 28 and the adiabatic chamber 25. A heating means for heating the heat expansion solution 24 that is filled in the pressure generating space 25a is established.

The adiabatic chamber 25 includes an upper space 25d formed at an upper surface thereof. The bottom of the upper space 25d is an inclined plane 25c that is downwardly inclined toward the hollow 25b. The heat expansion solution 24 is filled between the inclined plane 25c of the upper space 25d and the membrane 26.

It is preferable that the hollow 25b of the adiabatic chamber 25 and the center of the outlet 22b formed in the cover plate 22 are placed on the same line and the center of the membrane 26 is placed therebetween.

According to the above embodiment, although the bolts 23, 27 are used as means for fixing the cover plate 22 to the base plate 21 and as means for fixing the disc 28 to the adiabatic chamber 25, such means are not confined to bolts, and various fixing means other than bolts can be selectively used.

The flow control valve also includes a sealing structure for preventing the liquid coolant from leaking. In more detail, a receiving groove 22d that is depressed from the inner surface of the cover plate 22 at a given depth is formed and an O-shaped ring 30 is inserted therein.

In FIG. 3, 21a represents a through hole formed in a selected portion of the base plate 21, which is used for connecting electric power lines 44, 44' to the terminal lugs 42, 42'.

Next, there will be described various heating means for heating the heat expansion solution 24 in the flow control valve with reference to the accompanying drawings.

Figure 4A:
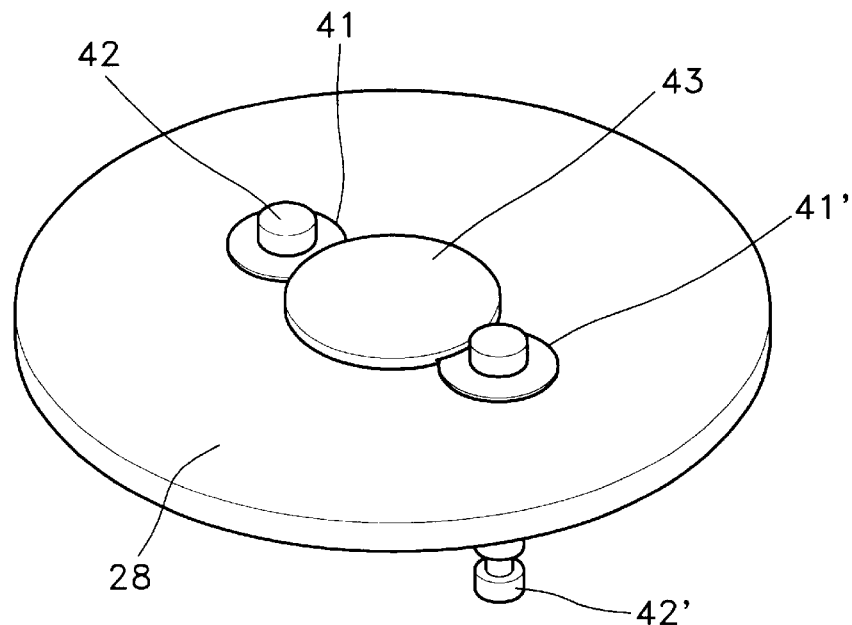
FIG. 4a is a perspective view of a heating member in the flow control valve of FIG. 3
Figure 4B:
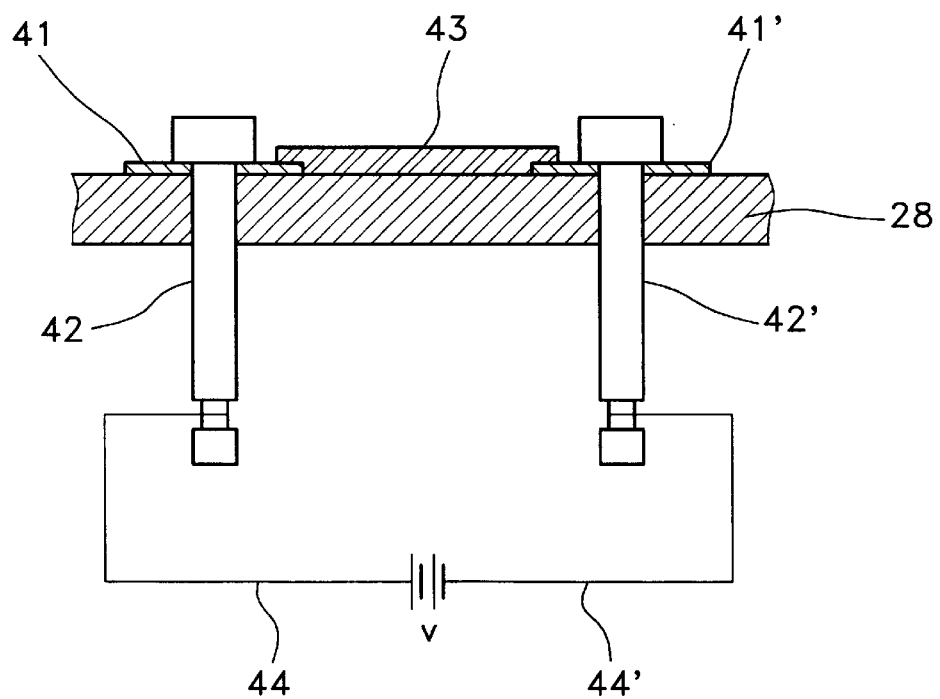

FIG. 4a is a perspective view of a heating means in the flow control valve of FIG. 3 and FIG. 4b is a sectional view of the heating means of FIG. 4a.

Referring to FIGS. 4a and 4b, a heating means includes a pair of disc shaped thin film electrodes 41, 41' that are formed apart from each other on disc 28. A pair of terminal lugs 42, 42' are respectively electrically connected to the pair of thin film electrodes, and are extended below the disc 28 through respective through holes that are formed at respective central portions of the pair of thin film electrodes 41, 41'. A disc shaped thin heating film 43 is disposed at the central portion of the disc 28 such that both edges of the thin heating film 43 are electrically connected with the pair of thin film electrodes 41, 41'.

Here, it is preferable that the thin film electrodes 41, 41' are made of aluminum and the thin heating film 43 is of Ta-Al alloy.

The pair of terminal lugs 42, 42' are connected to a pair of power lines 44, 44' to heat the thin heating film 43 during application of electric power(V) through the power lines 44, 44'. The temperature of the thin heating film 43 varies according to the intensity of the electric power applied. In order to control the temperature of the thin heating film precisely, the electric power should be applied appropriately.

As shown in FIG. 3, in the flow control valve with the above configuration, most of the heat expansion solution 24 is filled in the pressure generating space 25a that is positioned in the lower portion of the adiabatic chamber 25. Therefore, heat exchange between the high temperature heat expansion solution 24 and the low temperature coolant is reduced by minimizing the contact between the heat expansion solution 24 and the coolant filled in the coolant space 22c through the membrane 26.

Below, there will be a detailed description of the operation of a flow control valve according to the present invention.

Referring to FIG. 3, FIG. 4a and FIG. 4b, when the electric power(V) is not applied to the heating means, the thin heating film 43 is not heated and the heat expansion solution 24 is not expanded. Accordingly, the membrane 26 does not swell toward the outlet 22b. Therefore, the liquid coolant that is introduced through the inlet 22a of the cover plate 22 passes through the space 22c of the cover plate 22. The liquid coolant is then exhausted toward the evaporator through the outlet 22b.

When it is intended to decrease the flow of the liquid coolant, an appropriate voltage(V) for the system is applied and the thin heating film 43 is heated, in turn raising the temperature of the heat expansion solution 24.

At this time, the heat expansion solution 24 that is filled in the pressure generating space 25a of the adiabatic chamber 25 is expanded, goes up through the hollow 25b of the adiabatic chamber 25, and fills the upper space 25d. Thus, continuous expansion of the heat expansion solution 24 makes the membrane 26 swell toward the outlet 22b of the cover plate 22, thereby decreasing the flow of the liquid coolant that is exhausted through the outlet 22b.

Figure 5:
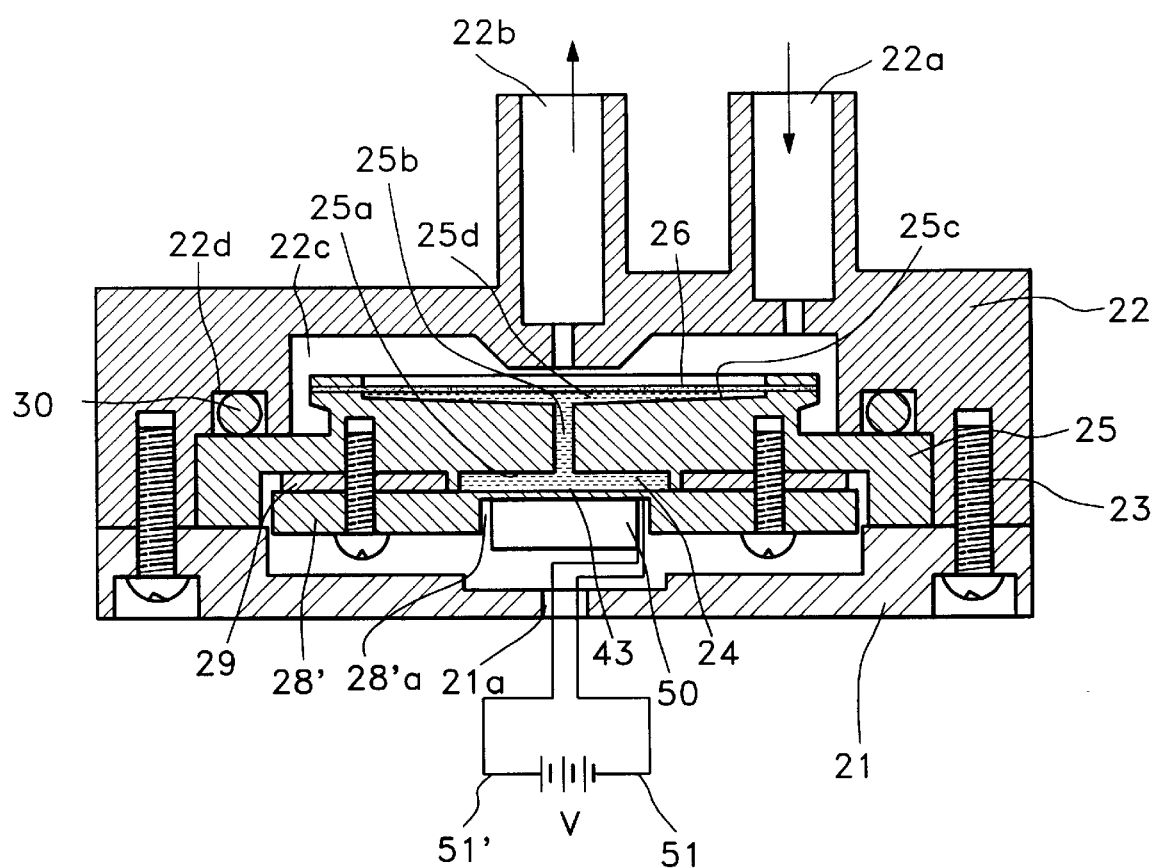
FIG. 5 is a sectional view of a heating member according to another embodiment of the present invention.

FIG. 5 shows a flow control valve having heating means according to another embodiment of the invention.

In the flow control valve of FIG. 5, a receiving groove 28'a of a selected depth is formed at a central portion of the bottom face of a disc 28'. A positive temperature coefficient (PTC) element 50 is coupled to the receiving groove 28'a. Upper and lower faces of the PTC element 50 are electrically connected to power lines 51, 51'.

The PTC element 50 is made of ceramic material and emits heat as electric power is applied thereto. Of course, the temperature of the PTC element 50 can be controlled by controlling the applied voltage (V).

According this embodiment of the flow control valve, when the electric power is not applied to the PTC element 50, the disc 28' is not heated and the membrane 26 is not transformed, i.e., not swollen. Therefore, the liquid coolant that is introduced through the inlet 22a of the cover plate 22 passes through the space 22c of the cover plate 22, and is exhausted toward the evaporator through the outlet 22b.

In contrast, when the electric power is applied to the PTC element 50, the disc 28' is heated and expands the heat expansion solution 24. Accordingly, the membrane 26 is swollen, thereby decreasing flow of the liquid coolant that is exhausted from the outlet 22b.

Figure 6:
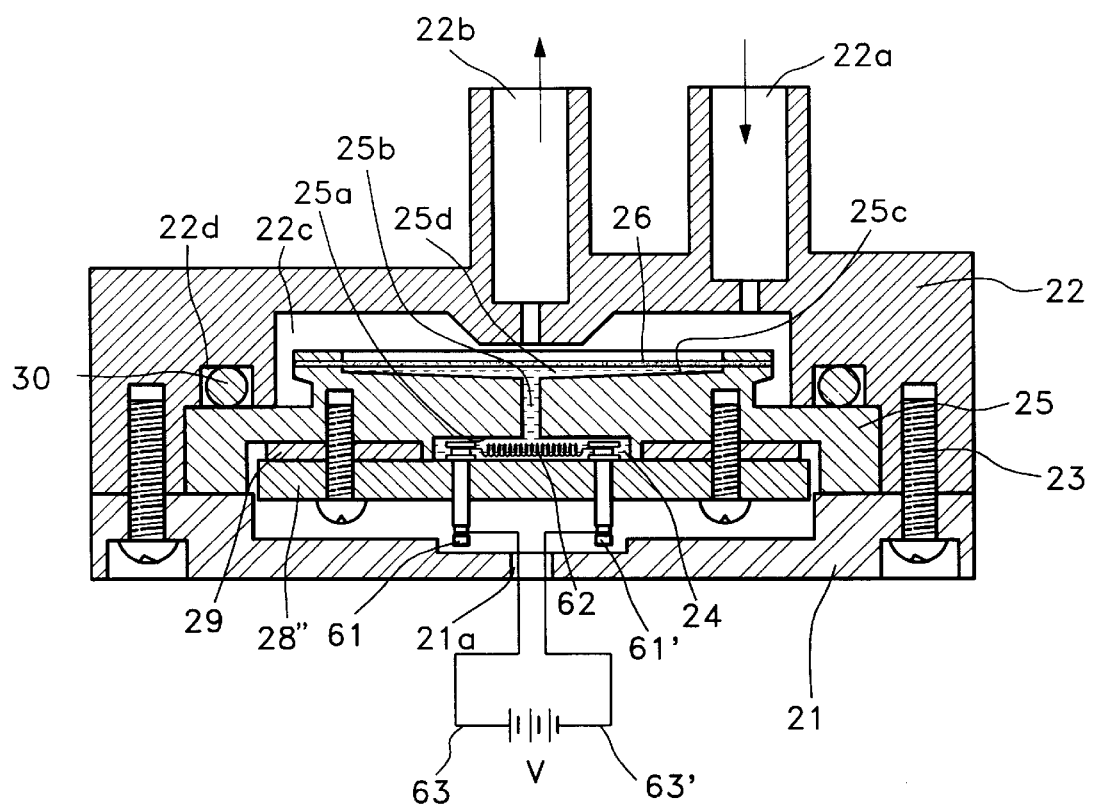
FIG. 6 is a sectional view of a heating member according to still another embodiment of the present invention.

FIG. 6 shows a flow control valve having a heating means according to still another embodiment of the invention.

Referring to FIG. 6, the heating means includes a pair of terminal lugs 61, 61' respectively inserted in a pair of through holes formed in disc 28". One pair of ends of the terminal lugs 61, 61' extend below the disc 28" through the pair of through holes of the disc 28" and the other ends thereof protrude over the upper face of the disc 28". A heating coil 62 is coupled to the ends of the pair of terminal lugs 61, 61' that protrude over the upper face of the disc 28".

Here, it is preferable that the heating coil 62 is made of nichrome. The terminal lugs 61, 61' are respectively connected to the electric power lines 63, 63' to heat the heating coil 62 as the electric power is applied. Of course, the heating coil 62 can control calories generated according to the intensity of the applied electric power.

Thus, the flow control valve controls the flow of the coolant that is exhausted from the outlet 22b by the expansion of the heat expansion solution 24 and the swelling of membrane 26 accordingly as the electric power is applied to the heating coil 62.

Since the principles of the operation of the above described flow control valve are the same as the previous embodiments, they are intentionally omitted.

In summary, since the flow control valve comprises a base plate, a cover plate mounted on the base plate and having an inlet and an outlet; an adiabatic chamber formed within the cover plate, supported on the upper surface of the base plate, having a pressure generating space at the lower portion of such chamber, wherein the pressure generating space is filled with heat expansion solution, and a hollow formed at the mid portion of such chamber to be connected with the pressure generating space; a membrane coupled to the upper circumference of the adiabatic chamber; a coolant space where coolant is filled located between the cover plate and the adiabatic chamber; a disc coupled to the lower surface of the adiabatic chamber, which seals the pressure generating space; and a heating member for heating the heat expansion solution filled in the pressure generating space, heat exchange is thereby restrained between the heat expansion solution of high temperature and the coolant of low temperature. Consequently, the flow control valve secures reliability in operation by preventing the temperature of the heat expansion solution in a high temperature state from being lowered by the coolant in a low temperature state and thereby effectively expanding the heat expansion solution.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A flow control valve comprising:
   a base plate;
   a cover plate coupled on said base plate, said cover plate having an inlet and an outlet;
   a chamber formed within said cover plate, supported on an upper surface of said base plate;
   said chamber comprising:
   (a) a pressure generating space formed at a lower portion of said chamber and filled with heat expansion solution;
   (b) a passage formed at a mid-portion of said chamber to communicate with said pressure generating space; and
   (c) an upper space separated from said pressure generating space and communicated with said pressure generating space through said passage, wherein said passage is narrow relative to a size of said pressure generating space and said upper space;
   a membrane coupled to an upper circumference of said chamber, said membrane forming a coolant space in which coolant is filled, said coolant space being disposed between said cover plate and said chamber;
   a disc coupled to a lower surface of said chamber, for sealing said pressure generating space; and
   means for heating said heat expansion solution filled in said pressure generating space,
   whereby heat exchange between higher temperature heat expansion solution and lower temperature coolant is reduced by minimizing contact between the heat expansion solution and the coolant in said coolant space through said membrane.

2. The flow control valve according to claim 1, further comprising a sealing member for preventing said heat expansion solution from leaking between said chamber and said disc.

3. The flow control valve according to claim 1, wherein said upper space is formed on an upper face of said chamber, said upper space having an inclined plane inclined downwardly toward said passage such that said heat expansion solution is filled between said inclined plane and said membrane.

4. The flow control valve according to claim 1, wherein said cover plate comprises a receiving groove formed at lower face thereof at a selected depth, wherein a sealing member is inserted therein such that leakage of said coolant is prevented.

5. The flow control valve according to claim 1, wherein said heating means comprises:
   a pair of thin film electrodes apart from each other formed on an upper surface of said disc;
   a pair of terminal lugs respectively electrically connected to said pair of thin film electrodes through a pair of through holes formed in said disc, wherein one end of each of said pair of terminal lugs extends below said disc; and
   a thin heating film formed on said disc, for electrically connecting said pair of thin film electrodes to each other.

6. The flow control valve according to claim 1, wherein said heating means comprises a PTC element established at lower face of said disc for heating said disc.

7. The flow control valve according to claim 1, wherein said heating means comprises:
   a pair of terminal lugs respectively inserted through a pair of through holes formed in said disc, wherein one end of each of said pair of terminal lugs extends below said disc and the other end of each of said pair of terminal lugs extends above said disc; and
   a heating coil for connecting said other ends of said terminal lugs to each other.

8. A flow control valve comprising:
   a base plate;
   a cover plate coupled on said base plate, said cover plate having an inlet and an outlet;
   a chamber formed within said cover plate, supported on an upper surface of said base plate,
   said chamber comprising:
   (a) a pressure generating space formed at a lower portion of said chamber and filled with heat expansion solution;
   (b) a passage formed at a mid-portion of said chamber to communicate with said pressure generating space; and
   (c) an upper space separated from said pressure generating space and communicated with said pressure generating space trough said passage, wherein said passage is narrow relative to a size of said pressure generating space and said upper space;
   a membrane coupled to an upper circumference of said chamber, said membrane forming a coolant space in which coolant is filled, said coolant space being disposed between said cover plate and said chamber;
   a disc coupled to a lower surface of said chamber, for sealing said pressure generating space; and
   a heater which heats said heat expansion solution filled in said pressure generating space,
   whereby heat exchange between higher temperature heat expansion solution and lower temperature coolant is reduced by minimizing contact between the heat expansion solution and the coolant in said coolant space through said membrane.

* * * * *